United States Patent
Kim et al.

(10) Patent No.: US 9,749,653 B2
(45) Date of Patent: Aug. 29, 2017

(54) MOTION VECTOR ENCODING/DECODING METHOD AND DEVICE AND IMAGE ENCODING/DECODING METHOD AND DEVICE USING SAME

(71) Applicant: SK TELECOM CO., LTD., Seoul (KR)

(72) Inventors: Sunyeon Kim, Seoul (KR); Jeongyeon Lim, Seongnam-si (KR); Byeungwoo Jeon, Seongnam-si (KR); Joohee Moon, Seoul (KR); Yunglyul Lee, Seoul (KR); Haekwang Kim, Seoul (KR); Jongki Han, Seoul (KR); Jungyoup Yang, Seoul (KR); Kwanghyun Won, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/449,446

(22) Filed: Mar. 3, 2017

(65) Prior Publication Data
US 2017/0188042 A1    Jun. 29, 2017

Related U.S. Application Data

(63) Continuation of application No. 15/449,109, filed on Mar. 3, 2017, which is a continuation of application
(Continued)

(30) Foreign Application Priority Data

Sep. 10, 2009   (KR) ........................ 10-2009-0085586

(51) Int. Cl.
*H04N 7/32*    (2006.01)
*H04N 19/52*    (2014.01)
(Continued)

(52) U.S. Cl.
CPC ........... *H04N 19/52* (2014.11); *H04N 19/124* (2014.11); *H04N 19/56* (2014.11); *H04N 19/61* (2014.11)

(58) Field of Classification Search
CPC .... H04N 7/2684; H04N 7/50; H04N 7/26872; H04N 7/26856
(Continued)

(56) References Cited

U.S. PATENT DOCUMENTS 6,154,491 A    11/2000   Uetani
7,751,631 B2    7/2010   Youn et al.
(Continued)

FOREIGN PATENT DOCUMENTS

KR    10-1998-0007737 A    3/1998

OTHER PUBLICATIONS

International Search Report dated Apr. 21, 2011 for PCT/KR2010/005878.
(Continued)

*Primary Examiner* — Nguyen Truong
(74) *Attorney, Agent, or Firm* — Hauptman Ham, LLP

(57) ABSTRACT

The present disclosure relates to a method and apparatus for encoding/decoding a motion vector and a method and apparatus for encoding/decoding video using same. The motion vector encoding method includes selecting a predicted motion vector candidate set including one or more predicted motion vector candidates for a block; determining one or more search ranges for predicted motion vector candidate set; selecting one predicted motion vector candidate among one or more predicted motion vector candidates as predicted motion vector for each search point with respect to each search point within search range by first determination criterion prearranged with video decoding apparatus; selecting one predicted motion vector among the predicted motion
(Continued)

vectors for each search point by a second determination criterion not prearranged with the video decoding apparatus, and determining predicted motion vector, differential motion vector, and current motion vector; and generating and encoding the differential motion vector as motion information.

12 Claims, 10 Drawing Sheets

Related U.S. Application Data

No. 13/395,205, filed as application No. PCT/KR2010/005878 on Aug. 31, 2010, now Pat. No. 9,628,814.

(51) Int. Cl.
*H04N 19/61* (2014.01)
*H04N 19/124* (2014.01)
*H04N 19/56* (2014.01)

(58) Field of Classification Search
USPC .................................................. 375/240.16
See application file for complete search history.

(56) References Cited

U.S. PATENT DOCUMENTS

| 2001/0008545 | A1 | 7/2001 | Takeda et al. |
| 2003/0128762 | A1 | 7/2003 | Nakagawa et al. |
| 2005/0111741 | A1 | 5/2005 | Kim et al. |
| 2006/0067406 | A1 | 3/2006 | Kitada et al. |
| 2006/0133506 | A1 | 6/2006 | Dang et al. |
| 2009/0034621 | A1 | 2/2009 | Joch et al. |
| 2009/0180550 | A1 | 7/2009 | Park et al. |
| 2010/0284465 | A1 | 11/2010 | Benzler et al. |

OTHER PUBLICATIONS

Narroschke, Matthias, et al., Adaptive Prediction Error Coding in Spatial and Frequency Domain for H.264/AVC, ITU—Telecommunications Standardization Sector, Study Group 16 Question 6, Video Coding Experts Group (VCEG), Jan. 16-20, 2006, pp. 1-13, 29th Meeting, Bangkok, Thailand, document No. VCEG-AB06.

| SYMBOL | CODEWORD | CODE LENGTH |
|---|---|---|
| 0 | 1 | 1 bit |
| 1 | 010 | 3 bit |
| -1 | 011 | 3 bit |
| 2 | 00100 | 5 bit |
| -2 | 00101 | 5 bit |
| 3 | 00110 | 5 bit |
| -3 | 00111 | 5 bit |
| ⋮ | ⋮ | ⋮ |

| SEARCH POINT i | $\overrightarrow{DMVC}$ | $\overrightarrow{PMVC}$ | FIRST DETERMINATION CRITERION | $\overrightarrow{PMV_i^{opt}}$ | SECOND DETERMINATION CRITERION | $\overrightarrow{DMV^{opt}}$ |
|---|---|---|---|---|---|---|
| (-1, -1) | (-1, -1) | $MV^A = (2, 0)$ | 30 | (2, 1) | 80 | |
| | | $MV^B = (2, 1)$ | 10 | | | |
| | | $MV^C = (2, 2)$ | 70 | | | |
| (-1, 0) | (-1, 0) | $MV^A = (2, 0)$ | 10 | (2, 0) | 70 | |
| | | $MV^B = (2, 1)$ | 70 | | | |
| | | $MV^C = (2, 2)$ | 100 | | | |
| (-1, 1) | (-1, 1) | $MV^A = (2, 0)$ | 40 | (2, 1) | 40 | |
| | | $MV^B = (2, 1)$ | 20 | | | |
| | | $MV^C = (2, 2)$ | 70 | | | |
| (0, -1) | (0, -1) | $MV^A = (2, 0)$ | 70 | (2, 1) | 30 | |
| | | $MV^B = (2, 1)$ | 30 | | | |
| | | $MV^C = (2, 2)$ | 100 | | | |
| (0, 0) | (0, 0) | $MV^A = (2, 0)$ | 100 | (2, 1) | 20 | (0, 0) |
| | | $MV^B = (2, 1)$ | 20 | | | |
| | | $MV^C = (2, 2)$ | 50 | | | |
| (0, 1) | (0, 1) | $MV^A = (2, 0)$ | 40 | (2, 0) | 50 | |
| | | $MV^B = (2, 1)$ | 60 | | | |
| | | $MV^C = (2, 2)$ | 80 | | | |
| (1, -1) | (1, -1) | $MV^A = (2, 0)$ | 100 | (2, 2) | 60 | |
| | | $MV^B = (2, 1)$ | 60 | | | |
| | | $MV^C = (2, 2)$ | 50 | | | |
| (1, 0) | (1, 0) | $MV^A = (2, 0)$ | 40 | (2, 1) | 100 | |
| | | $MV^B = (2, 1)$ | 30 | | | |
| | | $MV^C = (2, 2)$ | 80 | | | |
| (1, 1) | (1, 1) | $MV^A = (2, 0)$ | 80 | (2, 2) | 80 | |
| | | $MV^B = (2, 1)$ | 50 | | | |
| | | $MV^C = (2, 2)$ | 20 | | | |

*FIG. 13*

MOTION VECTOR ENCODING/DECODING METHOD AND DEVICE AND IMAGE ENCODING/DECODING METHOD AND DEVICE USING SAME

CROSS REFERENCE TO RELATED APPLICATION

The present application is a continuation of U.S. patent application Ser. No. 15/449,109, filed Mar. 3, 2017, which is a continuation of U.S. patent application Ser. No. 13/395, 205, filed Apr. 28, 2012, which is a National Phase application of International Application No. PCT/KR2010/ 005878, filed Aug. 31, 2010, which is based upon and claims the benefit of priority from Korean Patent Application No. 10-2009-0085586, filed on Sep. 10, 2009. The disclosures of the above-listed applications are hereby incorporated by reference herein in their entirety.

TECHNICAL FIELD

The present disclosure relates to a method and an apparatus for encoding/decoding a motion vector and a method and an apparatus for encoding/decoding a video using the same. More particularly, the present disclosure relates to a method and an apparatus for encoding a motion vector by using a more accurate predicted motion vector without adding information on a predicted motion vector used for encoding the motion vector to achieve a higher encoding efficiency in a video compression field of encoding or decoding a video.

BACKGROUND ART

The statements in this section merely provide background information related to the present disclosure and may not constitute prior art.

A motion vector encoding and decoding method conventionally used in a video encoding and decoding field is to perform predictive encoding of a current motion vector with respect to a corresponding motion predicted block by using motion vector of spatially positioned surrounding blocks as predicted motion vectors. In other words, since a motion vector of a current block (hereinafter, referred to as a "current motion vector") has a close relation with motion vectors of surrounding blocks, a predicted motion vector (PMV) for the current motion vector is first calculated from the motion vectors of the surrounding blocks through a predetermined method and only a differential motion vector (DMV) for the PMV is encoded instead of encoding the current motion vector itself, so as to considerably reduce the quantity of bits to be encoded and thus improve the encoding efficiency. In addition, the motion estimation is performed by using a predetermined search range in which the PMV serves as an initial search point, so that a more similar motion vector than the PMV is determined in a process of the motion estimation. That is, a more accurate motion vector is estimated while a convergence rate in the process of the motion estimation is increased.

Conventionally, the more similar the PMV is to the current vector, the more the encoding efficiency is increased, enabling the most efficient compression in the predictive encoding of the motion vector. Accordingly, through generating multiple predicted motion vector candidates including the motion vectors of temporally or spatial-temporally adjacent blocks or other motion vectors calculated by a method of combining the motion vectors of the spatially adjacent blocks and the temporally adjacent blocks, as well as the motion vectors of the spatially adjacent blocks, as the predicted motion vector candidates and estimating and using a predicted motion vector which is the most appropriate for encoding the current motion vector among the multiple predicted motion vectors, the predictive encoding efficiency can be further improved. Further, estimation of the more accurate motion vector achieved through defining a search range having a center which is a position indicated by each predicted motion vector and performing the motion estimation while using the multiple predicted motion vectors can further improve the encoding efficiency.

However, in order to properly reconstruct the original current motion vector from the differential motion vector predictive-encoded in the decoding process, it is necessary to recognize a PMV used as the predicted motion vector among the finite number of predicted motion vector candidates. To this end, the simplest motion vector encoding method is a method of selecting the most similar predicted motion vector among the finite number of predicted motion vector candidates for the current motion vector and encoding the selected predicted motion vector together with information on the predicted motion vector used for the normal reconstruction of the current motion vector. The aforementioned method may improve the encoding efficiency by utilizing the most similar predicted motion vector to the current motion vector among the motion vectors of the temporal-spatially available adjacent blocks, but additional information on the used predicted motion vector is also required to be encoded, thereby degrading the encoding efficiency.

DISCLOSURE

Technical Problem

Therefore, a main aspect of the present disclosure is to achieve a higher encoding efficiency through encoding a motion vector by using a more accurate predicted motion vector without adding information on which predicted motion vector is used when the motion vector is encoded for encoding of a video.

Technical Solution

An aspect of the present disclosure provides a method of encoding a motion vector for a block, including; selecting a predicted motion vector candidate set including one or more predicted motion vector candidates for the block; determining one or more search ranges for the predicted motion vector candidate set; selecting one predicted motion vector candidate among the one or more predicted motion vector candidates as a predicted motion vector for each search point, with respect to each search point within the search range in accordance with a first determination criterion prearranged with a video decoding apparatus; selecting one predicted motion vector among the predicted motion vectors for each search point in accordance with a second determination criterion prearranged with the video decoding apparatus, and determining a predicted motion vector, a differential motion vector, and a current motion vector; and generating and encoding the differential motion vector as motion information.

Another aspect of the present disclosure provides an apparatus for encoding a motion vector for a block, including: a predicted motion vector candidate selector for selecting a predicted motion vector candidate set including one or more predicted motion vector candidates for the block; a motion estimator for determining a search range for the predicted motion vector candidate set, selecting one predicted motion vector candidate among the one or more predicted motion vector candidates as a predicted motion vector for each search point, with respect to each search point within the search range in accordance with a first determination criterion prearranged with a video decoding apparatus, selecting one predicted motion vector among the predicted motion vectors for each search point in accordance with a second criterion not prearranged with the video decoding apparatus, and determining a predicted motion vector, a differential motion vector, and a current motion vector; and a motion information encoder for generating and encoding the differential motion vector as motion information.

Another aspect of the present disclosure provides a method of decoding a motion vector for a block, including: decoding encoded motion information and reconstructing a differential motion vector; selecting a predicted motion vector candidate set including one or more predicted motion vector candidates for the block; selecting one predicted motion vector candidate among the one or more predicted motion vector candidates as a predicted motion vector for a search point according to the reconstructed differential motion vector in accordance with a first determination criterion prearranged with a video encoding apparatus; and reconstructing a current motion vector by using the selected predicted motion vector and the reconstructed differential motion vector.

Another aspect of the present disclosure provides an apparatus for decoding a motion vector for a block, including: a motion information decoder for decoding encoded motion information and reconstructing a differential motion vector; a motion vector determiner for selecting a predicted motion vector candidate set including one or more predicted motion vector candidates for the block and selecting one predicted motion vector candidate among the one or more predicted motion vector candidates as a predicted motion vector for a search point according to the reconstructed differential motion vector in accordance with a first determination criterion prearranged with a video encoding apparatus; and a motion vector reconstructor for reconstructing a current motion vector by using the selected predicted motion vector and the reconstructed differential motion vector.

Another aspect of the present disclosure provides a method of encoding a video in the unit of blocks, including: determining a predicted motion vector and a differential motion vector among one or more predicted motion vector candidates in accordance with a first determination criterion prearranged with a video decoding apparatus, and a second determination criterion not prearranged with the video decoding apparatus; determining a current motion vector by using the determined predicted motion vector and differential motion vector; encoding the differential motion vector as motion information for a current block; motion compensating the current block by using the determined current motion vector and generating a predicted block; subtracting the predicted block from the current block and generating a residual block; encoding the residual block and generating encoded residual data; and generating and outputting encoded data including the encoded residual data and the encoded motion information.

Another aspect of the present disclosure provides an apparatus for encoding a video in the unit of blocks, including: a motion vector encoder for determining a predicted motion vector and a differential motion vector among one or more predicted motion vector candidates in accordance with a first determination criterion prearranged with a video decoding apparatus, and a second determination criterion not prearranged with the video decoding apparatus, determining a current motion vector by using the determined predicted motion vector and differential motion vector, and encoding the differential motion vector as motion information for a current block; a motion compensator for motion compensating the current block by using the determined current motion vector to generate a predicted block; a subtracter for subtracting the predicted block from the current block to generate a residual block; an encoder for encoding the residual block to generate encoded residual data; and an encoded data generator for generating and outputting encoded data including the encoded residual data and the encoded motion information.

Another aspect of the present disclosure provides a method of decoding a video in the unit of blocks, including: extracting and decoding encoded motion information from encoded data to reconstruct a differential motion vector; selecting one predicted motion vector candidate among one or more predicted motion vector candidates as a predicted motion vector for a search point according to the reconstructed differential motion vector in accordance with a first determination criterion prearranged with a video encoding apparatus; reconstructing a current motion vector by using the reconstructed differential motion vector and the selected predicted motion vector; motion compensating a current block by using the reconstructed current motion vector to generate a predicted block; extracting and decoding encoded residual data from the encoded data to reconstruct a residual block; and adding the reconstructed residual block and the predicted block to reconstruct the current block.

Another aspect of the present disclosure provides an apparatus for decoding a video in the unit of blocks, including: an information extractor for extracting encoded motion information and encoded residual data from encoded data; a motion vector decoder for decoding the encoded motion information to reconstruct a differential motion vector, selecting one predicted motion vector candidate among one or more predicted motion vector candidates as a predicted motion vector for a search point according to the reconstructed differential motion vector in accordance with a first determination criterion prearranged with a video encoding apparatus, and reconstructing a current motion vector by using the reconstructed differential motion vector and the selected predicted motion vector; a motion compensator for motion compensating a current block by using the reconstructed current motion vector to generate a predicted block; a decoder for decoding the encoded residual data to reconstruct a residual block; and an adder for adding the reconstructed residual block and the predicted block to reconstruct the current block.

Advantageous Effects

According to the present disclosure as described above, the present disclosure can encode the motion vector by using a more accurate predicted motion vector and there is no need to add information for identifying the predicted motion vector to the encoded data, thereby improving an efficiency of the motion vector encoding.

DESCRIPTION OF DRAWINGS

FIG. 13 is a table illustrating a process of encoding and decoding motion information on a current block according to an aspect of the present disclosure.

MODE FOR INVENTION

Figures 1, 2:
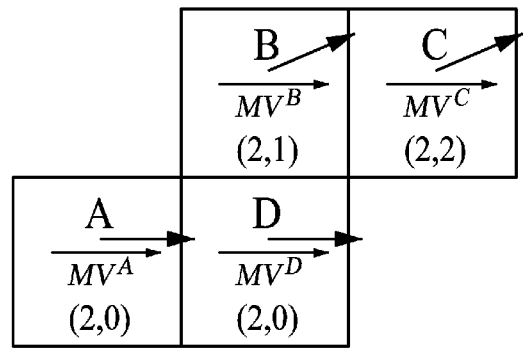
FIG. 1 is a diagram illustrating a process of encoding motion vectors according to the standard of H.264/AVC.
FIG. 2 is a table illustrating the number of bits per symbol for the entropy encoding.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus, a video decoding apparatus, a motion vector encoding apparatus, or a motion vector decoding apparatus described hereinafter may be a personal computer (PC), notebook computer, personal digital assistant (PDA), portable multimedia player (PMP), PlayStation Portable (PSP), or mobile communication terminal, and represent a variety of apparatuses equipped with, for example, a communication device such as a modem for carrying out communication between various devices or wired/wireless communication networks, a memory for storing various programs and data for encoding and decoding motion vectors or encoding and decoding videos using the motion vectors, and a microprocessor for executing the programs to effect operations and controls.

In addition, the video encoded into encoded data or a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, a WiBro (Wireless Broadband) also known as WiMax network, and a mobile communication network or a communication interface such as cable or USB (universal serial bus).

In addition, although the video encoding apparatus and the video decoding apparatus may be provided with the functions of performing the inter prediction as well as the intra prediction by using motion estimation and motion compensation, which lacks a direct correlation with the aspects of the present disclosure, a detailed description will be provided to avoid any confusions.

A video typically includes a series of pictures each of which is divided into predetermined areas, such as blocks. When each picture is divided into blocks, each of the blocks is classified into an intra block or an inter block depending on the method of classification. The intra block means the block that is encoded through an intra prediction coding which is within a current picture where the current encoding is performed for generating a predicted block by predicting a current block using pixels of a reconstructed block that underwent previous encoding and decoding and then encoding the differential value of the predicted block from the pixels of the current block. The inter block means the block that is encoded through an inter prediction coding which generates the predicted block by predicting the current block in the current picture through referencing one or more past pictures or future pictures to predict the current block in the current picture and then encoding the differential value of the predicted block from the current block. Here, the picture that is referenced in encoding or decoding the current picture is called a reference picture.

FIG. 1 is a diagram illustrating a process of encoding motion vectors according to the standard of H.264/AVC.

In FIG. 1, block D refers to a current block in which a motion vector is to be encoded, and block A, block B, and block C refer to surrounding blocks of block D. It is defined that $\overline{MV^A}$, and $\overline{MV^B}$, $\overline{MV^C}$, and $\overline{MV^D}$ are motion vectors of block A, block B, block C, and block D, respectively, and have horizontal components $MV_x^A$, $MV_x^B$, $MV_x^C$, and $MV_x^D$ and vertical components $MV_y^A$, $MV_y^B$, $MV_y^C$, and $MV_y^D$, respectively. The motion vector of the current block (herein, referred to as "the current motion vector") $\overline{MV^D}$ is (2,0), and the motion vectors $\overline{MV^A}$, $\overline{MV^B}$, and $\overline{MV^C}$ of the surrounding blocks are (2,0), (2,1), and (2,2), respectively. Further, a predicted motion vector (PMV) $\overline{PMV^D}$ for the motion vector of the current block is calculated with Equation 1, and it is defined that the predicted motion vector $\overline{PMV^D}$ has a horizontal component $PMV_x^D$ and a vertical component $PMV_y^D$.

$$\overline{PMV^D} = \begin{bmatrix} PMV_x^D \\ PMV_y^D \end{bmatrix} = \begin{bmatrix} \text{Median}(MV_x^A, MV_x^B, MV_x^C) \\ \text{Median}(MV_y^A, MV_y^B, MV_y^C) \end{bmatrix} \quad \text{Equation 1}$$

Referring to Equation 1, it can be identified that the predicted motion vector for the current motion vector is calculated by Median (·) which calculates a median of the motion vectors of the surrounding blocks (block A, block B, and block C). When the predicted motion vector $\overline{PMV^D}$ of the current motion vector $\overline{MV^D}$ is obtained using Equation 1, a differential motion vector $\overline{DMV^D}$ obtained by differentiating the predicted motion vector from the current motion vector to be encoded may be calculated by using Equation 2, and the differential motion vector is encoded by a predefined method, such as an entropy encoding, and stored (or transmitted).

$$\overline{DMV^D} = \overline{MV^D} - \overline{PMV^D} = \begin{bmatrix} MV_x^D - PMV_x^D \\ MV_y^D - PMV_y^D \end{bmatrix} \quad \text{Equation 2}$$

As illustrated in FIG. 1, when the current motion vector $\overline{MV^D}$ is (2,0), the predicted motion vector using the median by Equation 1 is (2,1), and the differential motion vector $\overline{DMV^D}$ by Equation 2 is (0, −1).

FIG. 2 is a table illustrating the number of bits per symbol for the entropy encoding.

When the differential motion vector $\overline{DMV^D}$ aforementioned with reference to FIG. 1 is encoded using a table for the entropy encoding illustrated in FIG. 2, four bits (one bit for a horizontal component and three bits for vertical components) are needed. In the meantime, when $\overline{MV^A}$ (2,0) is used as the predicted motion vector, the differential motion vector $\overline{DMV^D}$ becomes (0,0), so that the number of bits needed for the encoding of the differential motion vector $\overline{DMV^D}$ (0,0) is two (one bit for a horizontal component and one bit for a vertical component). Accordingly, a reduction of two bits can be achieved compared to the method of using the predicted motion vector using the median.

However, in order to use $\overline{MV^A}$ as the predicted motion vector as described above, because it is necessary to also transmit information on which motion vector among $\overline{MV^A}$, $\overline{MV^B}$, and $\overline{MV^C}$ is used as the predicted motion vector, an improved compression efficiency can not be assured. Accordingly, there is a need of a method of encoding a motion vector by using a more accurate predicted value without adding information on a predicted value which has been used in order to achieve a higher encoding efficiency.

Figure 3:
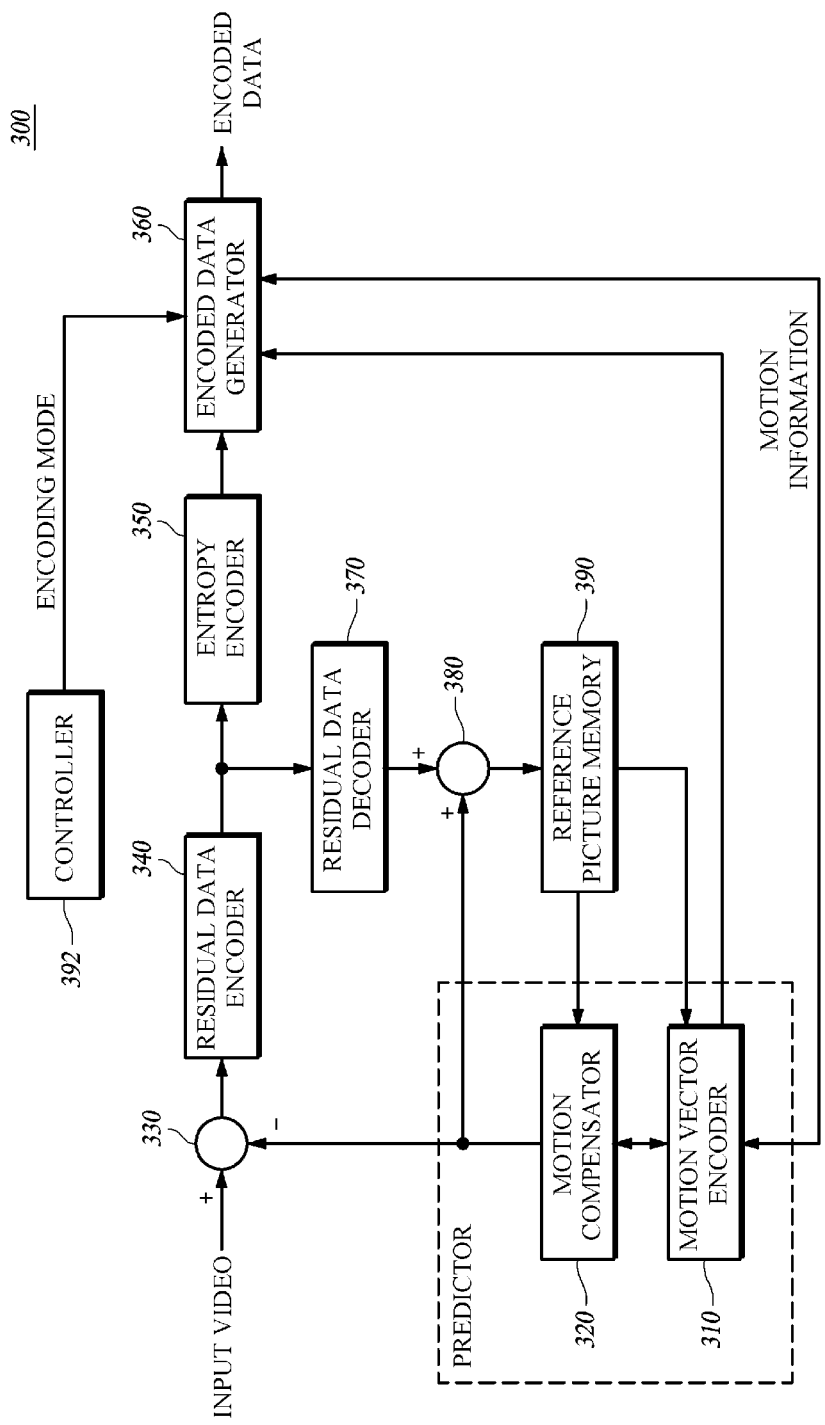
FIG. 3 is a block diagram schematically illustrating a video encoding apparatus according to an aspect of the present disclosure.

FIG. 3 is a block diagram schematically illustrating a video encoding apparatus according to an aspect of the present disclosure.

Referring to FIG. 3, a video encoding apparatus 300 according to an aspect of the present disclosure includes a motion vector encoder 310, a motion compensator 320, a subtracter 330, a residual data encoder 340, an entropy encoder 350, an encoded data generator 360, a residual data decoder 370, an adder 380, a reference picture memory 390, and a controller 392.

The motion vector encoder 310 determines a predicted motion vector and a differential motion vector from one or more predicted motion vector candidates according to a first determination criterion prearranged with a video decoding apparatus and a second determination criterion not prearranged with the video decoding apparatus determines a current motion vector by using the determined differential motion vector, and encodes the differential motion vector as motion information on the current block.

The meaning of "prearranged" in the first determination criterion prearranged with the video decoding apparatus is that the video encoding apparatus and the video decoding apparatus commonly have basis information for a preset determination and they may make the same determination by using the basis information. That is, the first determination criterion prearranged with the video decoding apparatus means that a criterion for making a certain determination is identically set between the video encoding apparatus and the video decoding apparatus and the basis information for making the determination is commonly included in the video encoding apparatus and the video decoding apparatus.

Further, the meaning of "not prearranged" is that the video encoding apparatus independently makes a certain determination, and basis information for making the determination is included in the video encoding apparatus, but is not included in the video decoding apparatus, so that a process of the determination is performed only in the video encoding apparatus. Accordingly, the second determination criterion not prearranged with the video decoding apparatus refers to a determination criterion belonged exclusively to the video encoding apparatus, and means that the criterion for making a certain determination and basis information for making the determination is set only in the video encoding apparatus, not in the video decoding apparatus.

To this end, the motion vector encoder 310 receives one block mode among multitude of them for a motion prediction from the controller 392 and estimates a motion vector of a block to be currently encoded in the unit of pixels (for example, in the 16×16 pixel unit, 16×8 pixel unit, 8×16 pixel unit, 8×8 pixel unit, 8×4 pixel unit, 4×8 pixel unit, and 4×4 pixel unit) corresponding to the input block mode with reference to at least one reference picture stored in the reference picture memory 390.

Here, the block mode refers to an encoding mode of a current block. For example, the block mode may be information on whether the block mode is an inter prediction mode, such as inter 16×16 and inter 8×4, and a size of a block for an inter prediction mode. Further, the block is a pixel unit into which a video is divided for encoding the video for convenience's sake and may be a pixel unit having a rectangle or square shape, such as the 4×4 pixel unit and the 4×8 pixel unit. However, the video is not always encoded in the unit of blocks, and may be encoded by the unit of standardized regions or non-standardized regions. Hereinafter, the video is encoded by the unit of blocks for the convenience of description.

In this case, the motion vector encoder 310 may directly receive information indicating the reference picture from the controller 392 and estimate a motion vector of the current block with reference to the reference picture identified through the received information. Alternatively, the motion vector encoder 310 may simply receive the block mode from the controller 392. When the motion vector encoder 310 simply receives the block mode, the motion vector encoder 310 may calculate a difference value between a picture including the current block (hereinafter, referred to as "a current picture") and each of all the available reference pictures temporarily positioned in surrounding regions, and estimate a current motion vector based on a reference picture having the smallest difference value. The motion vector encoder 310 may provide motion information and index information on the reference picture by encoding the estimated motion vector. Here, the motion information refers to motion information used for motion compensation of the current block in a motion vector decoder or the video decoding apparatus, and may be a current motion vector or a differential motion vector.

The motion compensator 320 motion-compensates the current block by using the current motion vector determined by the motion vector encoder 310 and generates a predicted block. To this end, the motion compensator 320 receives the motion information and the index information on the reference picture from the motion vector encoder 310 and performs the motion compensation for the reference picture by using the received motion information, to generate the predicted block.

The subtracter 330 subtracts the predicted block from the current block to generate a residual block. That is, the subtracter 330 generates the residual block including a residual signal by subtracting the predicted pixel value of the predicted block from the original pixel value of the current block.

The residual data encoder 340 transforms and quantizes the residual block. Specifically, the residual data encoder 340 transforms the residual signals of the residual block into a frequency domain to transform each residual signal of the residual block to a transform coefficient, and quantizes the residual block having the transform coefficient and generates the residual block having the quantized transform coefficient. Here, the residual data encoder 340 may transform the residual signal into the frequency domain by using various transforming techniques, such as the Hadamard Transform and the Discrete Cosine Transform (DCT) based transform, of transforming a video signal in a spatial axis into a frequency axis. Herein, the residual signal transformed into the frequency domain may be the transform coefficient. Further, the residual data encoder 340 may quantize the transform coefficient of the residual block by using the Dead Zone Uniform Threshold Quantization (DZUTQ) or the quantization weighted matrix among their various improvement options.

In the meantime, the foregoing description has been made as the residual data encoder 340 transforms and quantizes the residual block, but the residual data encoder 340 may not transform or quantize the residual block. That is, the residual data encoder 340 may not perform neither the transform nor the quantization, or may perform only the quantization of the residual block without transforming the residual block into the transform coefficient, or may transform the residual block and then not quantize the residual block. When the residual data encoder 340 performs neither the transform nor the quantization, the residual data encoder 340 may be omitted from the video encoding apparatus 300 according to the aspect of the present disclosure.

The entropy encoder 350 entropy encodes the residual block output from the residual data encoder 340 and outputs encoded residual data. That is, the entropy encoder 350 generates a quantized transform coefficient string, a transform coefficient string, or a residual signal string through scanning the quantized transform coefficient, transform coefficient, or residual signal of the residual block in various scanning methods including zig-zag scanning, and encodes the generated quantized transform coefficient string, transform coefficient string, or residual signal string by using various encoding techniques, such as the entropy encoding technique. In the meantime, the functions of the residual data encoder 340 and the entropy encoder 350 may be implemented as a single combined encoder. That is, when the residual data encoder 340 and the entropy encoder 350 are implemented as one encoder, it encodes the residual block and generates the encoded residual data.

The encoded data generator 360 generates and outputs encoded data including the encoded residual data and the encoded motion information. That is, the encoded data generator 360 generates and outputs the encoded data including the encoded residual data output from the encoder or the entropy encoder 350 and the encoded motion information output from the motion vector encoder 310. Further, the encoded data generator 360 adds information, which is output from the controller 392 or preset, on the block mode of the current block to the encoded data when outputting the encoded data. The encoded data generator 360 may be implemented with a multiplexer (MUX).

The residual data decoder 370 inversely quantizes and inversely transforms the residual block quantized by the residual data encoder 340. That is, the residual data decoder 370 inversely quantizes the quantized transform coefficients of the quantized residual block to generate the residual block having the transform coefficients, and inversely transforms the inversely quantized residual block to generate the residual block, i.e. a reconstructed residual block, having the residual signal. Here, the residual data decoder 370 may perform the inverse transform and the inverse quantization by inversely applying the transforming technique and the quantization technique used in the residual data encoder 340. Further, when the residual data encoder 340 performs only the transform, not the quantization, the residual data decoder 370 may perform the inverse transform, not the inverse quantization, and when the residual data encoder 340 performs only the quantization, not the transform, the residual data decoder 370 may perform only the inverse quantization, not the inverse transform. If the residual data encoder performs neither the transform nor the quantization or is not included in the video encoding apparatus 300, the residual data decoder 370 may perform neither the inverse transform nor the inverse quantization or may not be included in the video encoding apparatus 300.

The adder 380 adds the predicted block motion compensated and output by the motion compensator 320 and the residual block reconstructed by the residual data decoder 370 to reconstruct the current block. The reference picture memory 390 stores the reconstructed current block output from the adder 380 in the unit of pictures as the reference picture such that the reconstructed current block may be used as the reference picture when the motion vector encoder 310 or the motion vector compensator 320 estimates or compensates the motion for encoding a next block of the current block or a different block in the future.

The controller 392 applies a predetermined optimization criterion (e.g. a rate-distortion optimization criterion) to block modes selectable in the current block to be encoded in the video and determines a block mode (e.g. a block mode having the smallest rate-distortion cost) for the current block. If the block mode is preset in the video encoding apparatus 300, the controller 392 is not necessarily included in the video encoding apparatus 300 and may be optionally omitted, but it may serve to control the general operation of each component within the video encoding apparatus 300 without being omitted.

Although it is not illustrated in FIG. 3, the video encoding apparatus 300 according to the aspect of the present disclosure may additionally include an intra predictor for intra prediction and a deblocking filter for deblocking filtering the reconstructed current block. The residual data encoder 340 and the residual data decoder 370 may additionally perform the transform and the quantization (or the inverse transform and the inverse quantization) for a specific picture (e.g. an intra picture). Here, the deblocking filtering refers to an operation for reducing block distortion generated during the encoding of the video by the unit of blocks, may selectively use one of a method of applying a deblocking filter to a block boundary and a macroblock boundary, a method of applying a deblocking filter only to a macroblock boundary, or a method of using no deblocking filter.

Hereinafter, the aforementioned motion vector encoder 310 will be described with reference to FIG. 4 in more detail.

Figure 4:
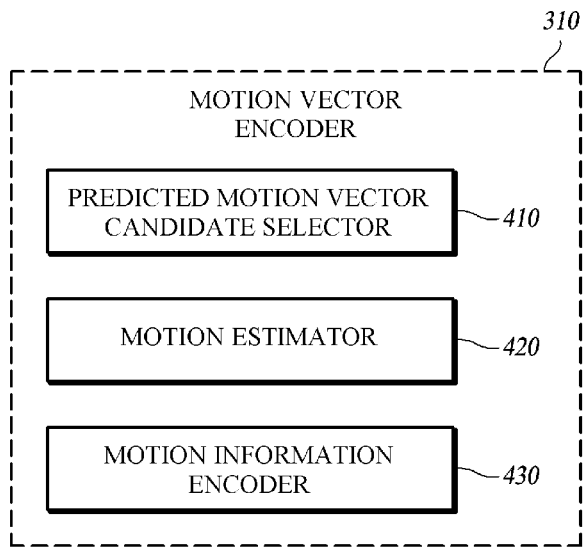
FIG. 4 is a block diagram schematically illustrating a motion vector encoding apparatus according to an aspect of the present disclosure.

FIG. 4 is a block diagram schematically illustrating the motion vector encoding apparatus according to an aspect of the present disclosure.

The motion vector encoding apparatus according to an aspect of the present disclosure may be implemented with the motion vector encoder 310 in the video encoding apparatus 300 according to the aspect of the present disclosure aforementioned with reference to FIG. 3, and therefore the motion vector encoder will be called the motion vector encoder 310 for the convenience of description to follow.

The motion vector encoder 310 according to the aspect of the present disclosure may include a predicted motion vector candidate selector 410, a motion estimator 420, and a motion information encoder 430.

The predicted motion vector candidate selector 410 selects a predicted motion vector candidate set including one or more predicted motion vector candidates for a block. That is, the predicted motion vector candidate selector 410 selects a predicted motion vector Candidate Set (CS) including N different predicted motion vector candidates available for use as the predicted motion vectors of the current motion vector according to a prearranged method between the motion vector encoder 310 and the motion vector decoder or between the video encoding apparatus 300 and the video decoding apparatus. As illustrated in FIG. 1, an example of the predicted motion vector candidate set CS may include motion vectors of the surrounding blocks A, B, and C of the current block. In this case, CS={$\overline{MV^A}$, $\overline{MV^B}$, $\overline{MV^C}$}.

However, more generally, the predicted motion vector candidate set CS may include more various motion vectors selected as the predicted motion vector candidates according to an implementation method or a necessity. For example, a motion vector of a block having the same position as the current block in the reference picture or motion vectors of surrounding blocks in a spatial axis may be used as the predicted motion vector candidate. Otherwise, a motion vector of a block corresponding to the position of the current block in a different layer or motion vectors of surrounding blocks in a spatial axis of the position of the current block in a different layer may be used as the predicted motion vector candidate. Further, another motion vector calculated by using the aforementioned motion vectors (e.g. an average or a median of the aforementioned motion vectors, or a scalar multiple of the aforementioned motion vectors) may be included in the predicted motion vector candidate. Finally, when there exists no median of the motion vectors of the surrounding blocks A, B, and C or no available predicted motion vector candidate, a predetermined value (e.g. (0,0)) may be used as the predicted motion vector candidate. That is, the predicted motion vector candidate set CS may be defined in various methods on the premise that the definition of the CS is prearranged between the motion vector encoder 310 and the motion vector decoder or between the video encoding apparatus 300 and the video decoding apparatus.

The motion estimator 420 determines search ranges according to the predicted motion vector candidate set CS, selects one predicted motion vector candidate among one or more predicted motion vector candidates as a predicted motion vector for each search point according to the first determination criterion prearranged with the video decoding apparatus, for each search point included in the search range, selects one predicted motion vector among the predicted motion vectors for the search points according to the second determination criterion not prearranged with the video decoding apparatus, and determines a predicted motion vector, a differential motion vector, and a current motion vector. That is, the motion estimator 420 determines search ranges for N different predicted motion vector candidates included in the predicted motion vector candidate set CS defined in the predicted motion vector candidate selector 410 and determines the predicted motion vector, the differential motion vector, and the corresponding current motion vector according to a predetermined motion estimating process according to an aspect of the present disclosure.

The motion information encoder 430 generates and encodes the differential motion vector as the motion information. That is, the motion information encoder 430 encodes the motion information (i.e. the differential motion vector that is a difference between the current motion vector and the predicted motion vector) on the current motion vector determined by the motion estimator 420 through a predefined method, such as the entropy encoding.

Hereinafter, the aforementioned motion estimator 420 will be described with reference to FIG. 5 in more detail.

Figure 5:
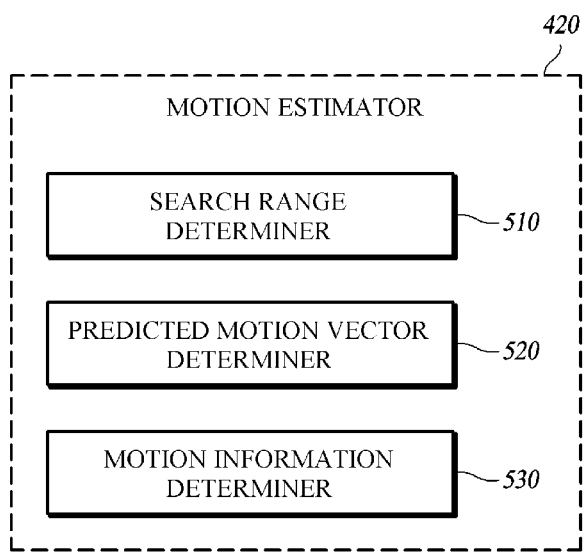
FIG. 5 is a block diagram schematically illustrating a motion estimator according to the aspect of the present disclosure.

FIG. 5 is a block diagram schematically illustrating the motion estimator according to the aspect of the present disclosure.

The motion estimator 420 according to the aspect of the present disclosure includes a search range determiner 510, a predicted motion vector determiner 520, and a motion information determiner 530.

The search range determiner 510 determines search ranges for the N different predicted motion vector candidates included in the predicted motion vector candidate set CS defined in the predicted motion vector candidate selector 410. The search range may be determined as a preset range, and may be identically or differently determined for each of the predicted motion vector candidates. For example, if there are three predicted motion vector candidates and the search range is set to a range (hereinafter, referred to "±1 pixel") extended in the unit of ±1 pixel from a center point, the search ranges for the three predicted motion vector candidates may be identically determined as the range of ±1 pixel, but the search ranges for the two predicted motion vector candidates may be identically determined as the range of ±1 pixel and the search range for the one remaining predicted motion vector candidate may be determined as the range of ±3 pixels. Hereinafter, the search range determined for each of the predicted motion vector candidates is called an individual search range.

Hereinafter, the search range and the individual search range determined according to the search range according to an aspect of the present disclosure will be described with reference to FIG. 6.

Figure 6A:
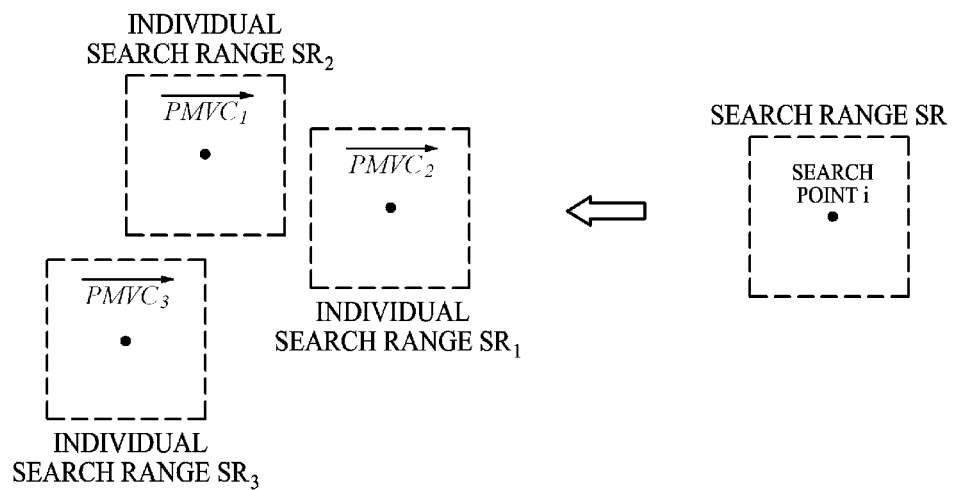
FIGS. 6A and 6B are diagrams illustrating search ranges and individual search ranges determined according to the search ranges according to the aspect of the present disclosure.
Figure 6B:
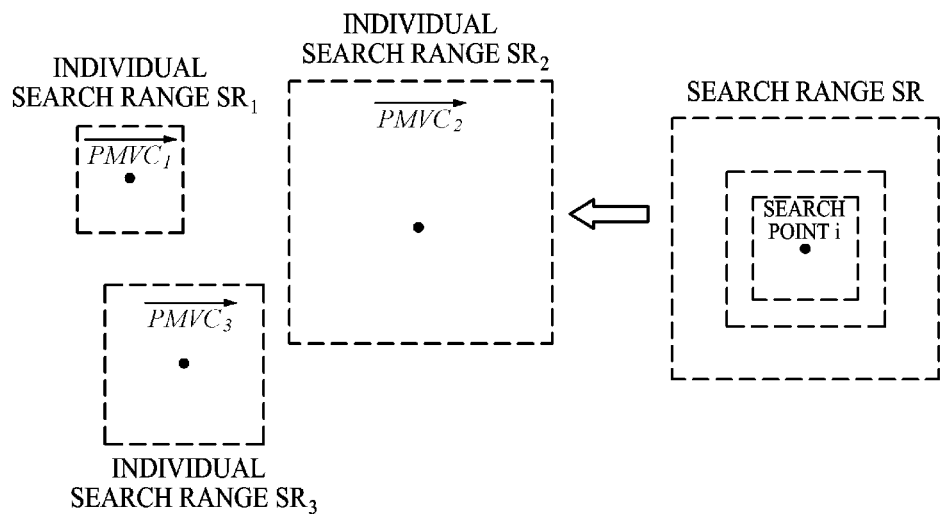

FIG. 6A illustrates the identically determined individual search ranges and FIG. 6B illustrates the differently determined individual search ranges. It is assumed in FIGS. 6A and 6B that the predicted motion vector candidate set CS defined in the predicted motion vector candidate selector 410 is CS={$\overline{MV^A}$, $\overline{MV^B}$, $\overline{MV^C}$} including the motion vectors of the surrounding blocks A, B, and C of the current block illustrated in FIG. 1 and the search ranges is the range of ±1 pixel.

The search point i of the search range SR in the range of ±1 pixel has nine search points (−1,0) (0,1), (1,1), (−1,1), (0,0), (1,0), (−1,−1), (0,−1), and (1,−1), but FIGS. 6A and 6B illustrate the search point (0,0), which is the center point in the search range, for the convenience of description. As such, when the search range is identically applied to each of the predicted motion vector candidates, the individual search ranges $SR_1$, $SR_2$, and $SR_3$ are determined as illustrated in FIG. 6A. Since the identical search range is applied to each of the predicted motion vector candidates, the individual search ranges $SR_1$, $SR_2$, and $SR_3$ have the search ranges of the same size.

However, when the search ranges are differently applied to each of the predicted motion vector candidates, the individual search ranges $SR_1$, $SR_2$, and $SR_3$ may be determined as illustrated in FIG. 6B. In FIG. 6B, the individual search range $SR_1$ is determined to be smaller than the search range, the individual search range $SR_2$ is determined to be larger than the search range, and the individual search range $SR_3$ is determined to have the same size as the search range. As such, when the search ranges are differently applied to each of the predicted motion vector candidates, the largest individual search range may be determined as the final search range. In FIG. 6B, the search range having the same size as the largest individual search range $SR_3$ is determined as the final search range.

As described above, for example, when the search ranges are differently determined for each of the predicted motion vector candidates, some predicted motion vector candidates among the predicted motion vector candidates may have a very low similarity to the other predicted motion vector candidates. That is, when some predicted motion vector candidates have a very low similarity to the other predicted motion vector candidates, it may be determined that some predicted motion vector candidates are highly probable to have a very low similarity to the current motion vector. Accordingly, in this case, the search ranges may be differently (e.g. in a large or small size) applied to the corresponding predicted motion vector candidates.

In addition, the number of individual search ranges may be differently defined according to a result of the predicted motion vector candidate selector 410. For example, when the predicted motion vector candidate set defined in the predicted motion vector candidate selector 410 includes only one median of the motion vectors of the surrounding blocks A, B, and C, the motion estimator 420 may determine one individual search range based on one predicted motion vector candidate. That is, the number and the sizes of the individual search ranges for the predicted motion vector candidates may be defined with various methods on the premise that the definition of the individual search range is prearranged between the motion vector encoder 310 and the motion vector decoder or between the video encoding apparatus 300 and the video decoding apparatus.

In the meantime, when the search range is applied to each of the predicted motion vector candidates and the individual search ranges are determined, each search point i of the search range indicates a position within each individual search range determined based on each predicted motion vector candidate, so that each search point i of the search range is the same as the differential motion vector candidate based on each of the predicted motion vector candidates.

Figure 7:
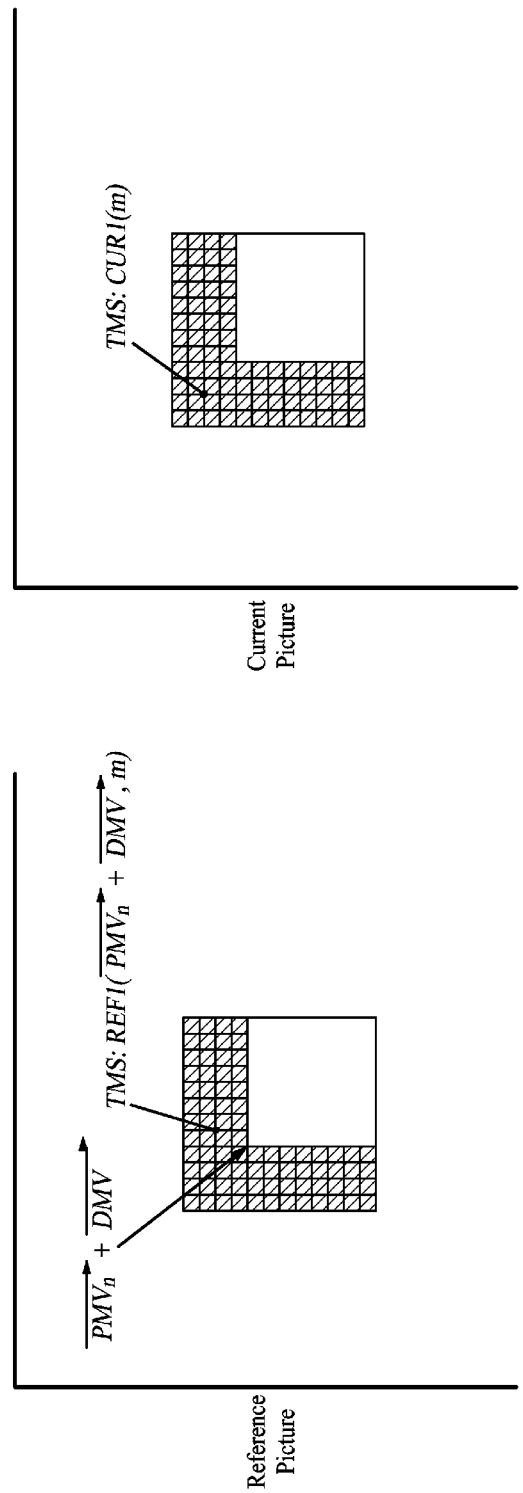
FIG. 7 is a diagram illustrating an adjacent pixel template matching method.

The predicted motion vector determiner 520 selects one predicted motion vector candidate, which the motion vector decoder or the video decoding apparatus may determine by itself according to a predetermined first determination criterion, among the N different predicted motion vector candidates as a predicted motion vector for each search point of the search range determined in the search range determiner 510. In this case, each search point within the search ranges is the differential motion vector. That is, since one search point within the search range means the same differential motion vector for the N predicted motion vector candidates, the change of the search point within the search range is the same as the change of the differential motion vectors for all motion vectors searchable in each individual search range. Accordingly, a process of determining the predicted motion vector for each search point within the search ranges is performed. Here, it is preferable that an adjacent pixel Template Matching (TM) method is used as the predetermined first determination criterion f(·) as illustrated in FIG. 7, and the adjacent pixel TM method may be calculated by Equation 3 as illustrated in FIG. 7.

$$PMV_i^{opt} = \underset{\overline{PMVC} \in CS}{\operatorname{argmin}} f(\overline{PMVC} \mid i) \qquad \text{Equation 3}$$

$$f(\overline{PMVC} \mid i) = TM(\overline{PMVC} \mid i)$$
$$= \sum_{m \in TMS} \{REF1(\overline{PMVC} + i, m) - CUR1(m)\}^2$$

In Equation 3, i represents an index designating the search points within the search ranges and $\overline{PMVC}$ represents the predicted motion vector candidates. That is, the predicted motion vector $\overline{PMV_i^{opt}}$ for each search point which is one predicted motion vector for minimizing the first determination criterion f(·) is selected from the N predicted motion vector candidates $\overline{PMVC}$ included in the CS for a predetermined search point i, and such a process is repeatedly performed to all search points (or all differential motion vectors). Here, $\overline{PMV_i^{opt}}$ represents the predicted motion vector for minimizing the first determination criterion f(·) for the search point i.

In this case, according to the adjacent pixel TM method, for the finite number of pixels of the adjacent blocks included in a Template Matching Set (TMS) that is a set of pixels of which relative positions are defined by index m designating a position of the pixel used for the adjacent pixel TM, a value of a predetermined function of a difference between a corresponding pixel REF1($\overline{PMVC}$+i,m) of a reference picture for each of the N different predicted motion vector candidates included in the search points at the same position and the corresponding pixel CUR1(m) of the current picture is calculated as a prediction error value. The corresponding pixel CUR1(m) of the current picture is the reconstructed video after the complete encoding and decoding, so that the motion vector encoder 310 and the motion vector decoder or the video encoding apparatus 300 and the video decoding apparatus may be aware of information on the corresponding pixel CUR1(m) of the current picture.

In Equation 3, a Sum of Squared Difference (SSD) is used as the predetermined function for calculating the prediction error, but other functions including a Sum of Absolute Difference (SAD) may be used according to applications and purposes of the aspect of the present disclosure. Further, the predetermined first determination criterion may be any criteria if the predicted motion vectors also can be determined by the motion vector decoder or the video decoding apparatus autonomically by using the predetermined reconstructed data (e.g. the value of the reconstructed surrounding pixel corresponding to the current block in the reference picture and the current picture) by the criteria on the premise that the definition of the first determination criterion is prearranged with the motion vector encoder 310 or the video encoding apparatus 300, as well as the adjacent pixel TM method illustrated in FIG. 3. That is, on the premise that the first determination criterion is shared between the motion vector encoder 310 and the motion vector decoder or the video encoding apparatus 300 and the video decoding apparatus in advance, the first determination criterion may be defined with various methods including the Boundary Matching method according to applications and purposes of the aspect of the present disclosure.

The motion information determiner 530 determines a differential motion vector among all predicted motion vectors within the search ranges determined in the predicted motion vector determiner 520 according to a predetermined second determination criterion. Here, the second determination criterion is preferably the rate-distortion optimization as Equation 4, but may be another method.

$$\overline{DMV^{opt}} = \underset{i \in SR}{\mathrm{argmin}} g(i \mid \overline{PMV_i^{opt}})$$

$$g(i \mid \overline{PMV_i^{opt}}) = J(i \mid \overline{PMV_i^{opt}})$$

$$= D(i + \overline{PMV_i^{opt}}) + \lambda R(i)$$

Equation 4

Equation 4 may be finally expressed as Equation 5 by using Equation 3.

$$\overline{DMV^{opt}} = \underset{i \in SR}{\mathrm{argmin}} g\{i \mid \underset{\overline{PMVC} \in CS}{\mathrm{argmin}} f(\overline{PMVC} \mid)\}$$

Equation 5

In Equation 4, $\overline{PMV_i^{opt}}$ is the predicted motion vector for each search point, which is determined by the predicted motion vector determiner 520 and which the motion vector decoder or the video decoding apparatus may determine by itself, within the search range determined by the search range determiner 510. Accordingly, the finally determined $\overline{DMV^{opt}}$ means the differential motion vector for minimizing the second determination criterion g(·) among the differential motion vectors using the predicted motion vector which the motion vector decoder or the video decoding apparatus may determine by itself, and the predicted motion vector and the differential motion vector determined through the aforementioned process are substituted for Equation 6, so that the current motion vector $\overline{MV}$ is calculated.

$$\overline{MV} = \overline{PMV_i^{opt}} + \overline{DMV^{opt}}$$

Equation 6

The current motion vector calculated by Equation 6 may be defined with various methods according to an application and a purpose of the aspect of the present disclosure.

As described above, the second determination criterion g(·) is preferably the rate-distortion optimization function J(·), but it may be defined with various methods according to an application and a purpose of the aspect of the present disclosure. For example, the second determination criterion g(·) may use the rate-distortion optimization function in which the rate function R(·) is omitted in order to reduce the complexity of the motion vector encoder 310 or the video encoding apparatus 300 or the rate-distortion optimization function in which $\overline{PMV_i^{opt}}$ used in the rate function R(·) uses a predetermined default value, such as a median, not the predicted motion vector obtained by the predicted motion vector determiner 520.

Figure 8:
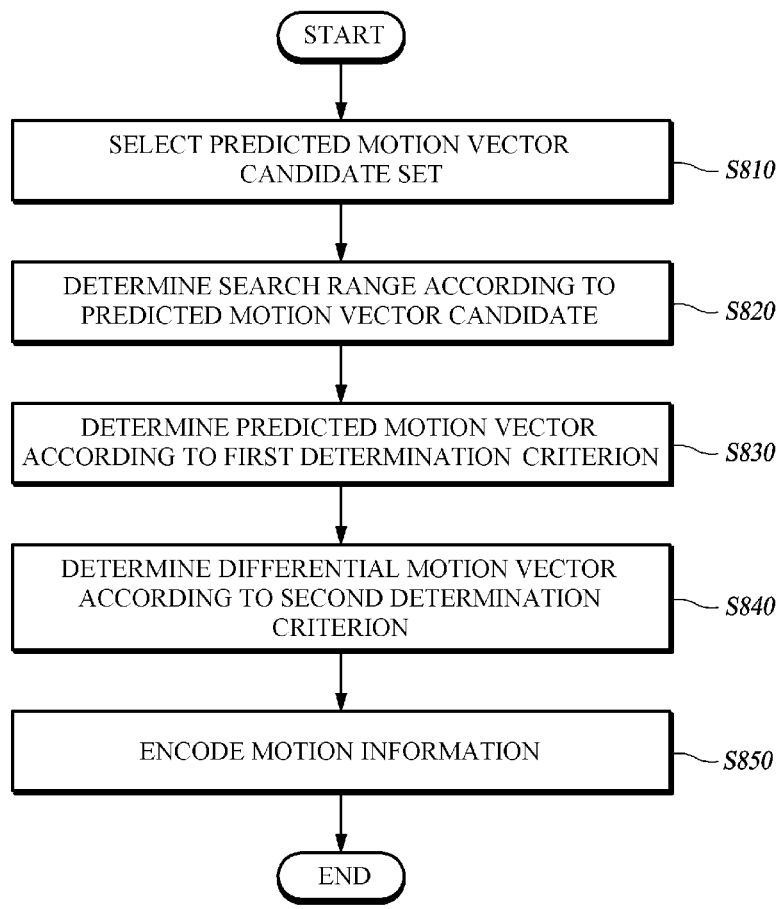
FIG. 8 is a flowchart illustrating a method of encoding a motion vector according to an aspect of the present disclosure.

FIG. 8 is a flowchart illustrating a method of encoding a motion vector according to an aspect of the present disclosure.

According to the method of encoding a motion vector according to the aspect of the present disclosure, the motion vector encoder 310 selects a predicted motion vector candidate set including one or more predicted motion vector candidates for a block, determines search ranges for the predicted motion vector candidate set, selects one predicted motion vector candidate among the one or more predicted motion vector candidates as a predicted motion vector according to a first determination criterion prearranged with the video decoding apparatus for each search point within the search ranges, selects one predicted motion vector according to a second determination criterion not prearranged with the video decoding apparatus, among the predicted motion vectors for each search point to determine a predicted motion vector, a differential motion vector, and a current motion vector, and generates and encodes the differential motion vector as motion information.

To specifically describe the method of encoding a motion vector according to the aspect of the present disclosure with reference to FIG. 8, the motion vector encoder 310 of the video encoding apparatus 300 selects a predicted motion vector candidate set CS including N different predicted motion vector candidates usable as the predicted motion vectors of the current motion vector according to a predetermined method previously appointed with the video decoding apparatus or the motion vector decoding apparatus (S810), determines search ranges for the N different predicted motion vector candidates included in the predicted motion vector candidate set CS (S820), selects one predicted motion vector candidate, which the video decoding apparatus or the motion vector decoder may determine by itself according to the first determination criterion, among the N different predicted motion vector candidates for each search point within the determined search ranges as a predicted motion vector for each search point (S830), determines one motion vector among the differential motion vectors using the predicted motion vector for each search point as a differential motion vector for the current motion vector according to the second determination criterion (S840), and encodes the determined differential motion vector as motion information (S850).

In step S810, the motion vector encoder 310 may select the predicted motion vector candidate set including the N different predicted motion vector candidates usable as the predicted motion vectors of the current motion vector through performing the same process as selecting the predicted motion vector candidate set by the predicted motion vector candidate selector 410 aforementioned with reference to FIG. 4.

In step S820, the motion vector encoder 310 determines the search ranges for the N different predicted motion vector candidates included in the predicted motion vector candidate set CS through performing the same process as determining the search ranges by the search range determiner 510 aforementioned with reference to FIG. 5.

In step S830, the motion vector encoder 310 determines one predicted motion vector, which the motion vector decoder or the video decoding apparatus may determine by itself, among the N predicted motion vector candidates for each search point designated as the differential motion vector within the search ranges for the N different predicted motion vector candidates as the predicted motion vector for each search point according to the first determination criterion through performing the same process as determining the predicted motion vector by the predicted motion vector determiner 520 aforementioned with reference to FIG. 5.

In step S840, the motion vector encoder 310 selects one motion vector among the predicted motion vectors for each search point within the search ranges determined by the search range determiner 510 according to the second determination criterion and determines the selected motion vector as the differential motion vector, and then determines the current motion vector according to the determined differential motion vector through performing the same process as determining the current motion vector and the differential motion vector for the current motion vector by the motion information determiner 530 aforementioned with reference to FIG. 5.

In step S850, the motion vector encoder 310 encodes the motion information (e.g. the differential motion vector) determined in the motion estimator 420 through performing the same process as encoding the motion information by the motion information encoder 430 aforementioned with reference to FIG. 5.

In the meantime, FIG. 8 illustrates the method of encoding the motion vector according to the aspect of the present disclosure, and the method may be variously modified and implemented without departing from the scope of the essential characteristics of the present disclosure. For example, it is not necessarily required to perform each step described in FIG. 8, some or entire steps may be selectively omitted or replaced with another steps according to a necessity, and orders of some or entire steps may be selectively changed and performed in parallel as well.

Figure 9:
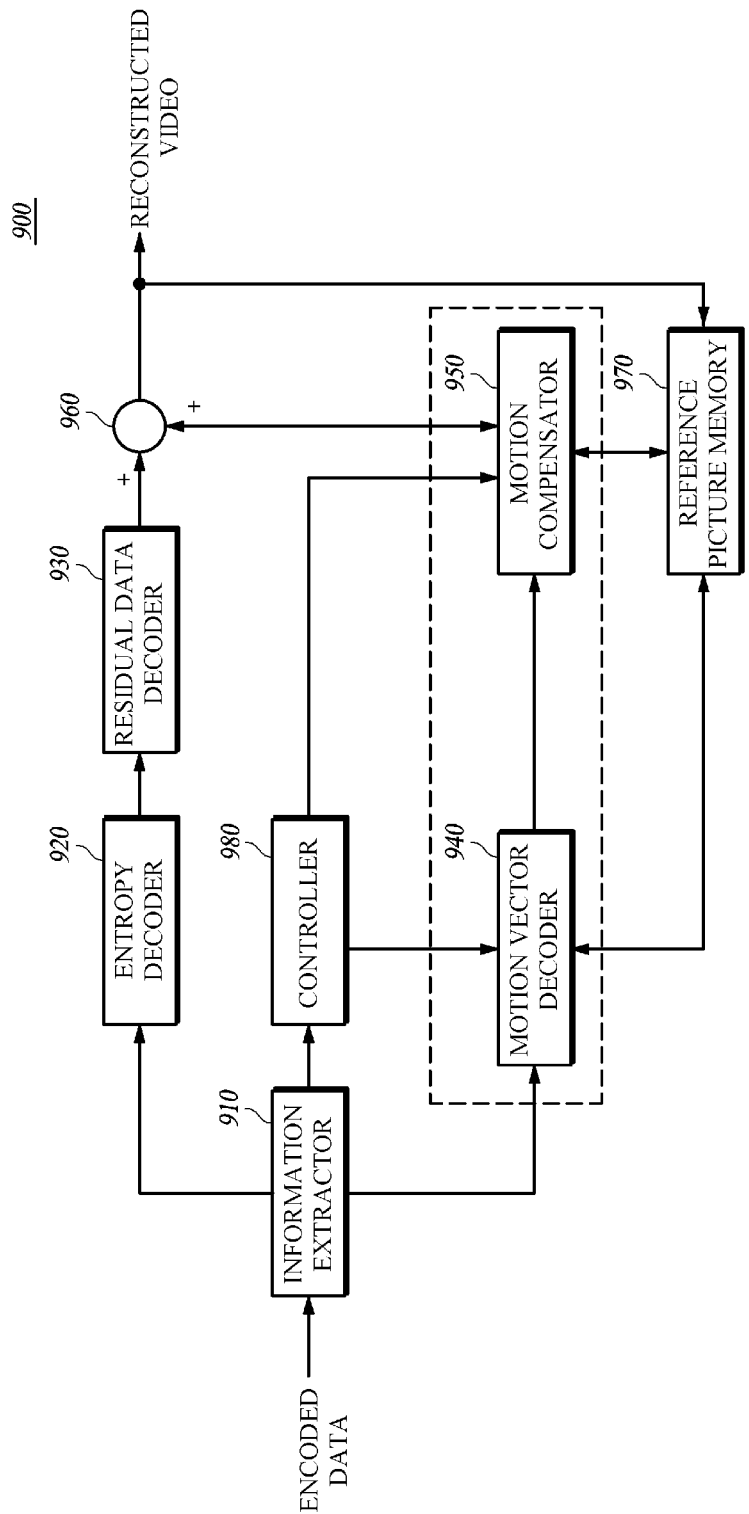
FIG. 9 is a block diagram schematically illustrating a video decoding apparatus according to the aspect of the present disclosure.

FIG. 9 is a block diagram schematically illustrating a video decoding apparatus according to the aspect of the present disclosure.

Referring to FIG. 9, the video decoding apparatus 900 according to the aspect of the present disclosure includes an information extractor 910, an entropy decoder 920, a residual data decoder 930, a motion vector decoder 940, a motion compensator 950, an adder 960, and a reference picture memory 970.

The information extractor 910 extracts encoded motion information and encoded residual data from encoded data. To this end, the information extractor 910 receives the encoded data and extracts information (e.g. an identifier) on a block mode, and outputs the extracted information on the block mode. Further, when the block mode is a motion vector omission mode (e.g. when the block mode is the intra 16×16 mode or the intra 4×4 mode), the information extractor 910 may extract and output the encoded residual data without extraction of the motion information from the encoded data. In the meantime, when the block mode is not a motion vector omission mode (e.g. when the block mode is the inter 16×16 mode, the inter 4×4 mode, or the P8×8 mode), the information extractor 910 extracts the encoded motion information and the encoded residual data from the encoded data and outputs the extracted motion information and residual data. In this case, the information extractor 910 may additionally extract index information on a reference picture from the encoded data and output the extracted index information. The information extractor 910 may be conventionally implemented with a demultiplexer, but may additionally have an entropy decoding function depending on an implementation scheme or a necessity.

The entropy decoder 920 decodes the encoded residual data output from the information extractor 910. That is, the entropy decoder 920 generates a quantized transform coefficient string through decoding binary data of the encoded residual data by using the entropy encoding method, and generates a residual block having a quantized transform coefficient resulted from inversely scanning the generated quantized transform coefficient string in the inverse zig-zag scanning or other various scanning methods. If the binary data of the encoded residual data is binary data in which the transform coefficient is encoded, the residual block decoded by the entropy decoder 920 may be the residual block having the transform coefficient. If the binary data of the encoded residual data is binary data in which a residual signal which is not transformed and quantized is encoded, the residual block decoded by the entropy decoder 920 may be the residual block having the residual signal.

The residual data decoder 930 inversely quantizes and inversely transforms the residual block decoded by the entropy decoder 920 to reconstruct the residual block. That is, the residual data decoder 930 inversely quantizes a quantized transform coefficient of the decoded residual block output from the entropy decoder 920 and inversely transforms the inverse-quantized transform coefficient to reconstruct the residual block having the residual signal. If the residual block decoded by the entropy decoder 920 has the quantized transform coefficient, the residual data decoder 930 performs both the inverse quantization and the inverse transform, but the residual block decoded by the entropy decoder 920 has the transform coefficient, the residual data decoder 930 does not perform the inverse quantization, but performs only the inverse transform. Further, if the residual block decoded by the entropy decoder 920 has only the residual signal, the residual data decoder 930 performs neither the inverse quantization nor the inverse transform or the residual data decoder 930 may be omitted in the video decoding apparatus 900. In the meantime, although FIG. 9 illustrates the video decoding apparatus independently including the entropy decoder 920 and the residual data decoder 930, the video decoding apparatus may include one decoder (not shown) having a combined function including the function of the entropy decoder 920 and the function of the residual data decoder 930. Accordingly, when the video decoding apparatus includes one decoder, the decoder decodes the encoded residual data and reconstructs the residual block.

The motion vector decoder 940 decodes the encoded motion information to reconstruct the differential motion vector, selects one predicted motion vector candidate among one or more predicted motion vector candidates as a predicted motion vector according to the a first determination criterion prearranged with the video encoding apparatus 300, and reconstructs the current motion vector by using the reconstructed differential motion vector and the selected predicted motion vector. To this end, the motion vector decoder 940 determines the predicted motion vector in the unit of blocks corresponding to the block mode according to the information on the block mode output from the information extractor 910 in the reference picture stored in the reference picture memory 970 according to the first determination criterion, decodes the encoded motion information (e.g. the encoded differential motion vector) output from the information extractor 910 to reconstruct the motion information, and reconstructs the current motion vector, which is the motion vector of the current block, by using the reconstructed motion information and the determined predicted motion vector.

The motion compensator 950 generates a motion compensation predicted block for the current block by using the reconstructed current motion vector. That is, the motion compensator 950 estimates the reference block indicated by the current motion vector, i.e. the motion vector of the current block, reconstructed in the reference picture stored in the reference picture memory 970 as a predicted block of the current block to generate the predicted block. Here, in the use of the reference picture, when the index information on the reference picture is output from the information extractor 910, the motion compensator 950 may use the reference picture identified by the index information on the reference picture among many reference pictures stored in the reference picture memory 970.

The adder 960 adds the reconstructed residual block and the predicted block and reconstructs the current block. The adder 960 adds the reconstructed residual block output from the decoder or the residual data decoder 930 to the predicted block predicted and output from the motion compensator 950 to reconstruct the current block. The reconstructed current block may be accumulated in the unit of pictures to be output as a reconstructed video or stored in the reference picture memory 970 as a reference picture, and may be used for estimation of a next block.

Although it is not illustrated in FIG. 9, the video decoding apparatus 900 according to the aspect of the present disclosure may further include an intra estimator for the intra prediction and a deblocking filter for deblocking filtering the reconstructed current block. Further, the residual data decoder 930 may additionally perform the inverse transform and the inverse quantization for a specific picture (e.g. the intra picture).

The controller 980 extracts various information, such as information on the extracted block mode and the index information on the reference picture, necessary for the decoding process and transfers the extracted information to the motion vector decoder 940 and the motion compensator 950, and performs the general control for all elements of the video decoding apparatus 900.

Hereinafter, the motion vector decoder 940 will be described with reference to FIG. 10 in more detail.

Figure 10:
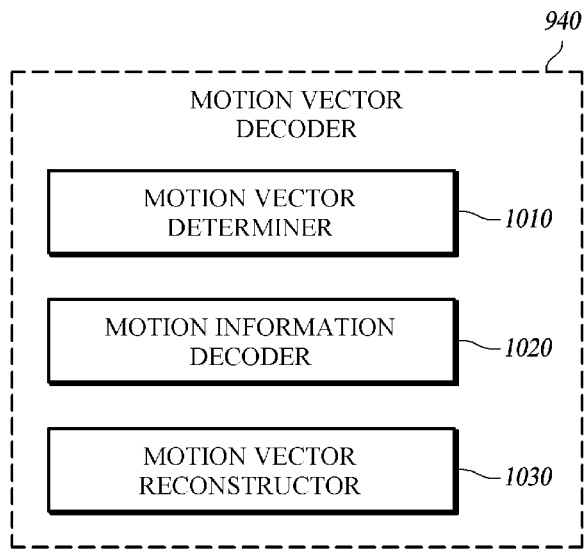
FIG. 10 is a block diagram schematically illustrating a motion vector decoding apparatus according to an aspect of the present disclosure.

FIG. 10 is a block diagram schematically illustrating the motion vector decoding apparatus according to an aspect of the present disclosure.

The motion vector decoding apparatus according to the aspect of the present disclosure may be implemented with the motion vector decoder 940 in the video decoding apparatus 900 according to the aspect of the present disclosure aforementioned through FIG. 9, so that the motion vector decoding apparatus according to the aspect of the present disclosure is called the motion vector decoder 940 for the convenience of description to follow.

The motion vector decoder 940 according to the aspect of the present disclosure includes a motion vector determiner 1010, a motion information decoder 1020, and a motion vector reconstructor 1030.

The motion vector determiner 1010 selects a predicted motion vector candidate set including one or more predicted motion vector candidates for a block, and selects one predicted motion vector candidate among the one or more predicted motion vector candidates of the predicted motion vector candidate set as a predicted motion vector according to a first determination criterion prearranged with the video encoding apparatus 300. That is, the motion vector determiner 1010 determines the predicted motion vector in the unit of blocks corresponding to a block mode according to the information on the block mode output from the information extractor 910 in the reference pictures stored in the reference picture memory 970 according to the first determination criterion.

Here, the motion vector determiner 1010 may determine search ranges for the predicted motion vector candidates of the predicted motion vector candidate set and select the predicted motion vector for a search point according to a reconstructed differential motion vector within the search range.

Figure 11:
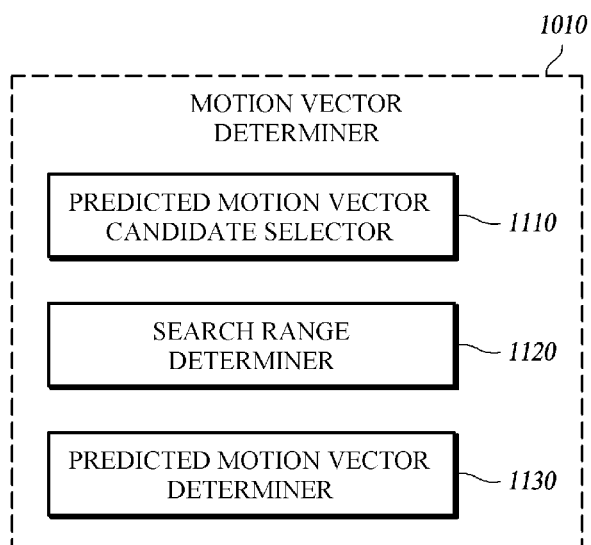
FIG. 11 is a block diagram schematically illustrating a motion vector determiner according to an aspect of the present disclosure.

The motion vector determiner 1010 may include a predicted motion vector candidate selector 1110, a search range determiner 1120, and a predicted motion vector determiner 1130 as illustrated in FIG. 11. Here, the search range determiner 1120 is not necessarily included and may be optionally omitted depending on an implementation scheme or a necessity.

Referring to FIG. 11, the predicted motion vector candidate selector 1110 selects the same predicted motion vector candidate set as the predicted motion vector candidate set selected by the video encoding apparatus 300 or the motion vector encoder 310 through performing a function the same as or similar to that of the predicted motion vector candidate selector 410 of the motion vector encoder 310 of the video encoding apparatus 300 aforementioned with reference to FIG. 3.

The search range determiner 1120 determines the same search range as that determined by the video encoding apparatus 300 or the motion vector encoder 310 through performing a function the same as or similar to that of the motion estimator 420 of the motion vector encoder 310 of the video encoding apparatus 300 aforementioned with reference to FIGS. 3 and 4. In this case, if a size and a shape of an individual search range for each predicted motion vector candidate is the same, the search range determiner 1120 may not determine the search range and may omit the determination of the search range, but if one or more sizes and shapes of the individual search ranges for the predicted motion vector candidates are different, the search range determiner 1120 may determine the search range as aforementioned through FIG. 6.

The predicted motion vector determiner 1130 selects one predicted motion vector among the one or more predicted motion vector candidates for the search point designated by the reconstructed differential motion vector according to the first determination criterion prearranged with the video encoding apparatus 300. Here, the first determination criterion may be variously implemented on the premise that the first determination criterion is prearranged between the video encoding apparatus 300 and the video decoding apparatus 900 or the motion vector encoder 310 and the motion vector decoder 940.

Referring to FIG. 10 again, the motion information decoder 1020 decodes the encoded motion information and reconstructs the differential motion vector. That is, the motion information decoder 1020 decodes the motion information (i.e. the differential motion vector) encoded by the motion vector encoder 430 of the video encoding apparatus 300 aforementioned through FIGS. 3 and 4 with a predefined method, such as the entropy decoding.

The motion vector reconstructor 1030 reconstructs the current motion vector by using the one selected predicted motion vector and the reconstructed differential motion vector. That is, the motion vector reconstructor 1030 reconstructs the current motion vector, which is the motion vector of the current block, by using the predicted motion vector determined by the motion vector determiner 1010 and the motion information (i.e. the differential motion vector) reconstructed by the motion information decoder 1020.

Figure 12:
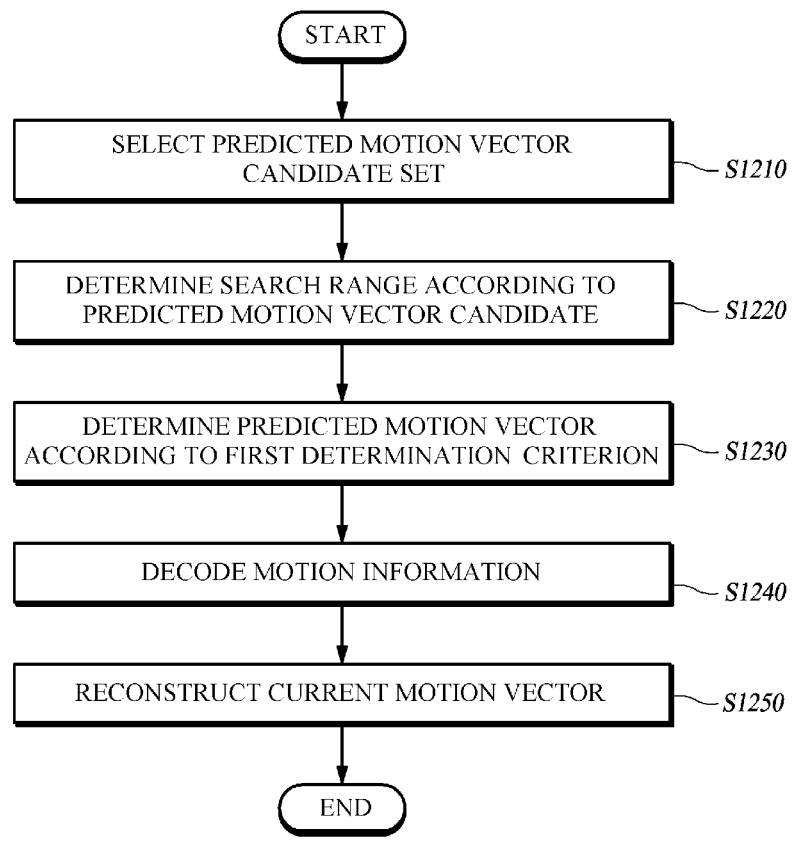
FIG. 12 is a flowchart illustrating a method of decoding a motion vector according to an aspect of the present disclosure.

FIG. 12 is a flowchart illustrating a method of decoding a motion vector according to an aspect of the present disclosure.

In the method of decoding a motion vector according to the aspect of the present disclosure, the motion vector decoder 940 decodes the encoded motion information and reconstructs the differential motion vector, selects a predicted motion vector candidate set including one or more predicted motion vector candidates for a block, and selects one predicted motion vector candidate among the one or more predicted motion vector candidates for a search point according to the reconstructed differential motion vector according to a first determination criterion prearranged with the video encoding apparatus, and reconstructs the current motion vector by using the one selected predicted motion vector and the reconstructed differential motion vector.

To specifically describe the method of decoding a motion vector according to the aspect of the present disclosure with reference to FIG. 12, the motion vector decoder 940 selects a predicted motion vector candidate set CS including N different predicted motion vector candidates usable as the predicted motion vectors of a current motion vector according to a method pre-arranged with the video encoding apparatus 300 or the motion vector encoder 310 (S1210), determines search ranges for the N different predicted motion vector candidates included in the predicted motion vector candidate set CS (S1220), determines one predicted motion vector determinable by itself for one search point designated as the differential motion vector within the search range for each of the N determined predicted motion vector candidates according to a first determination criterion (S1230), decodes the encoded motion information (e.g. the differential motion vector) with a predefined method, such as the entropy decoding, and reconstructs the motion information (S1240), and reconstructs the current motion vector by using the predicted motion vector determined in step S1230 and the motion information (e.g. the differential motion vector) reconstructed in step S1240 (S1250).

In step S1210, the motion vector decoder 940 selects the same predicted motion vector candidate set including the N different predicted motion vector candidates usable as the predicted motion vectors of the current motion vector as the predicted motion vector candidate set selected by the video encoding apparatus 300 or the motion vector encoder 310 through performing the same process as selecting the predicted motion vector candidate set by the predicted motion vector candidate selector 1110 of the motion vector determiner 1010 aforementioned through FIGS. 10 and 11.

In step S1220, the motion vector decoder 940 selects the same search ranges for the N different predicted motion vector candidates included in the predicted motion vector candidate set CS as the search ranges determined by the video encoding apparatus 300 or the motion vector encoder 310 through performing the same process as determining the search ranges by the search range determiner 1120 of the motion vector determiner 1010 aforementioned through FIGS. 10 and 11.

In step S1230, the motion vector decoder 940 selects the one predicted motion vector determinable by itself for one search point designated as the differential motion vector reconstructed in the search ranges for the N different predicted motion vector candidates according to the first determination criterion as the predicted motion vector determined by the video encoding apparatus 300 or the motion vector encoder 310.

In step S1240, the motion vector decoder 940 decodes the encoded motion information (i.e. the differential motion vector) with the predefined method, such as the entropy decoding, through performing the same process as decoding the motion information by the motion information decoder 1020 aforementioned through FIG. 10.

In step S1250, the motion vector decoder 940 reconstructs the current motion vector through performing the same process as reconstructing the current motion vector by the motion vector reconstructor 1030 aforementioned through FIG. 10.

In the meantime, FIG. 12 illustrates the method of decoding the motion vector according to the aspect of the present disclosure, and the method may be variously modified and implemented without departing from the scope of the essential characteristics of the present disclosure. For example, it is not necessarily required to perform each step described in FIG. 12, some or entire steps may be selectively omitted or replaced with another steps according to a necessity, and orders of some or entire steps may be selectively changed and performed in parallel as well. For example, step S1220 is not necessarily required to be performed and may be omitted.

FIG. 13 is a table illustrating a process of encoding and decoding motion information on a current block according to an aspect of the present disclosure.

FIG. 13 represents a search point i determined and calculated for determination of motion information of a current block, a differential motion vector candidate $\overline{DMVC}$ designated by the search point, a predicted motion vector candidate set $\overline{PMVC}$, a function value of the first determination criterion, a predicted motion vector $\overline{PMV^{opt}}$, for each search point determined according to the first determination criterion, a function value of the second determination criterion, and a differential motion vector $\overline{DMV^{opt}}$ determined according to the second determination criterion through the application of the example aforementioned through FIGS. 6 and 7.

The usable predicted motion vector candidate set identically selectable by both the video encoding apparatus 300 and the video decoding apparatus 900 or the motion vector encoder 310 and the motion vector decoder 940 is selected as a set of the motion vectors of selected surrounding blocks as illustrated in FIG. 13. In FIG. 13, for the convenience of description, it is exemplified that the search range is determines as a range extended by one pixel in upper, lower, left, and right directions from a center point thereof. The search point is the same as the differential motion vector for each predicted motion vector candidate, so that when the search point within the search range is changed, it is possible to obtain the differential motion vectors for all motion vector candidates within the search ranges. In the example of FIG. 13, the number of search points within the search ranges may be nine, and the search points are the same as the differential motion vector candidates $\overline{DMVC}$.

The video encoding apparatus 300 or the motion vector encoder 310 first calculates a function value for each search point and each predicted motion vector candidate corresponding to the search point according to the first determination criterion, and determines a predicted motion vector candidate minimizing the function value according to the first determination criterion among the predicted motion vector candidates for the search points as a predicted motion vector for each search point which the video decoding apparatus 900 or the motion vector decoder 940 may determine by itself. For example, referring to FIG. 13, in a case where the search point determined according to the differential motion vector candidate is (−1, −1), when a value of an adjacent pixel TM error is calculated for each of the predicted motion vector candidates (2,0), (2,1), and (2,2) of the predicted motion vector candidate set as the first determination criterion by using the adjacent pixel TM method, 30, 10, and 70 for each predicted motion vector candidate are calculated as the function values of the first determination criterion, and the predicted motion vector candidate (2,1) calculated by 10 which is the smallest value of the function values according to the first determination criterion may be selected as the predicted motion vector for each search point which the video decoding apparatus 900 or the motion vector decoder 940 may determine for the search point (−1,−1) by itself.

When the predicted motion vector for each search point which the video decoding apparatus 900 or the motion vector decoder 940 may determine for each search point by itself is determined through performing the aforementioned process for each search point by the video encoding apparatus 300 or the motion vector encoder 310, the video encoding apparatus 300 or the motion vector encoder 310 calculates a function value according to the second determination criterion for the determined predicted motion vector for each search point and finally determines the predicted motion vector and the search point (or the differential motion vector) making the calculated function value have the smallest value among the predicted motion vectors for each search point as a predicted motion vector and a search point (or the differential motion vector) having the best rate-distortion performance. For example, referring to FIG. 13, for each of the search points (−1,−1), (−1,0), (−1,1), (0,−1), (0,0), (0,1), (1,−1), (1,0), and (1,1), the predicted motion vectors for the search points having the smallest function value according to the first determination criterion is determined as (2,1), (2,0), (2,1), (2,1), (2,1), (2,0), (2,2), (2,1), and (2,2), respectively, and when the rate-distortion cost is calculated by using the rate-distortion optimization method as the second determination criterion for each predicted motion vector, the predicted motion vector candidate (2,1), the search point, and the differential motion vector (0,0), in which the function value according to the second determination criterion is calculated as the smallest value 20, may be determined as the final motion information. In this case, the estimated current motion vector becomes (2,1) in which the predicted motion vector (2,1) and the differential motion vector (0,0) are added. In this case, only the differential motion vector having the value (0,0) is encoded and included in the encoded data.

The video decoding apparatus 900 or the motion vector decoder 940 selects the predicted motion vector candidate set and determines the search range for the predicted motion vector candidate set as described above. Further, since the differential motion vector (0,0) extracted, encoded, and reconstructed from the encoded data may be defined as the search point (0,0), the video decoding apparatus 900 or the motion vector decoder 940 calculates a function value according to the first determination criterion for each predicted motion vector candidate corresponding to the search point (0,0) as described above and determines the predicted motion vector (2,1) having the smallest function value as the predicted motion vector of the current block. Then, the video decoding apparatus 900 or the motion vector decoder 940 reconstructs the current motion vector (2,1) (the predicted motion vector (2,1)+the differential motion vector (0,0)) by using the differential motion vector (0,0) and the predicted motion vector (2,1).

As described above, according to the aspect of the present disclosure, the present disclosure can improve an efficiency of the motion vector encoding by performing the motion estimation and the motion vector encoding by using the optimum predicted value without the transference of the information on the used predicted value. Further, according to the aspect of the present disclosure, the video encoding apparatus does not encode identification information for identifying the predicted motion vector among the plurality of predicted motion vector candidates which has been used as the predicted motion vector in the process of the motion estimation and the motion vector encoding, but the video decoding apparatus 900 can determine the predicted motion vector among the plurality of predicted motion vector candidates which has been used as the predicted motion vector by itself, so that the identification information or data encoded from the identification information may not be added to the encoded data, thereby always ensuring the improved encoding efficiency.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in a video compression field of video encoding or decoding, so that it can encode a motion vector by using a more accurate predicted motion vector and there is no need to add information for identifying the predicted motion vector to the encoded data, thereby improving the efficiency of the motion vector encoding.

The invention claimed is:

1. An apparatus of encoding a video using an inter prediction, the apparatus comprising:
a motion vector encoder configured to determine a current motion vector of a current block to be encoded;

a motion compensator configured to generate a predicted block by predicting the current block using the current motion vector;

a subtractor configured to generate a residual block by subtracting the predicted block from the current block; and a residual data encoder configured to identify whether transform from a spatial domain into a frequency domain and quantization are applied to residual signals in the residual block, and encode, into a bitstream, the residual signals in the residual block by selecting, based on the identification of whether the transform and the quantization are applied, one of the following processes:

transforming and then quantizing the residual signals to thereby encode the transformed and quantized residual signals, skipping the transform of the residual signals and quantizing the residual signals to thereby encode the quantized residual signals which are not transformed, and skipping both the transform and the quantization to thereby encode the residual signals which are neither transformed nor quantized.

2. The apparatus of claim 1, wherein the motion vector encoder is configured to define a candidate set including a plurality of predicted motion vector candidates by deriving the plurality of predicted motion vector candidates from neighboring blocks of the current block, select a predicted motion vector of the current block from the plurality of predicted motion vector candidates included in the candidate set, generate a differential motion vector of the current block by subtracting the predicted motion vector from the current motion vector, and encode the differential motion vector of the current block into the bitstream.

3. The apparatus of claim 2, wherein the motion vector encoder is configured to add at least one zero vector into the candidate set when the number of the plurality of predicted motion vector candidates derived from the neighboring blocks is less than a predetermined number.

4. The apparatus of claim 2, wherein the neighboring blocks for deriving the plurality of predicted motion vector candidates include:

adjacent blocks which are located in a current frame including the current block and are adjacent to the current block, and at least one block which is located in a reference frame other than the current frame, wherein a location of the at least one block in the reference frame is determined based on a location of the current block in the current frame.

5. The apparatus of claim 4, wherein the adjacent blocks include blocks located at left, upper and upper right sides of the current block.

6. The apparatus of claim 2, wherein each of the plurality of predicted motion vector candidates is derived from scalar multiplication of a motion vector of a neighboring block.

7. A method of encoding a video using an inter prediction, the apparatus comprising:

determining a current motion vector of a current block to be encoded;

generating a predicted block by predicting the current block using the current motion vector;

generating a residual block by subtracting the predicted block from the current block; and identifying whether transform from a spatial domain into a frequency domain and quantization are applied to residual signals in the residual block; and encoding, into a bitstream, the residual signals in the residual block by selecting, based on the identification of whether the transform and the quantization are applied, one of the following processes:

transforming and then quantizing the residual signals to thereby encode the transformed and quantized residual signals, skipping the transform of the residual signals and quantizing the residual signals to thereby encode the quantized residual signals which are not transformed, and skipping both the transform and the quantization to thereby encode the residual signals which are neither transformed nor quantized.

8. The method of claim 7, further comprising:

defining a candidate set including a plurality of predicted motion vector candidates by deriving the plurality of predicted motion vector candidates from neighboring blocks of the current block;

selecting a predicted motion vector of the current block from the plurality of predicted motion vector candidates included in the candidate set; and generating a differential motion vector of the current block by subtracting the predicted motion vector from the current motion vector, and encoding the differential motion vector of the current block into the bitstream.

9. The method of claim 8, wherein at least one zero vector is added into the candidate set when the number of the plurality of predicted motion vector candidates derived from the neighboring blocks is less than a predetermined number.

10. The method of claim 8, wherein the neighboring blocks for deriving the plurality of predicted motion vector candidates include:

adjacent blocks which are located in a current frame including the current block and are adjacent to the current block, and at least one block which is located in a reference frame other than the current frame, wherein a location of the at least one block in the reference frame is determined based on a location of the current block in the current frame.

11. The method of claim 10, wherein the adjacent blocks include blocks located at left, upper and upper right sides of the current block.

12. The method of claim 8, wherein each of the plurality of predicted motion vector candidates is derived from scalar multiplication of a motion vector of a neighboring block.

* * * * *